(12) United States Patent
Semper

(10) Patent No.: US 7,526,320 B2
(45) Date of Patent: Apr. 28, 2009

(54) METHOD AND SYSTEM FOR PROVIDING COMMUNICATION BETWEEN A MOBILE SWITCHING CENTER AND A MOBILE STATION OPERATING IN A DATA MODE USING AN IP-BASED NETWORK INTERFACE

(75) Inventor: William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 11/145,809

(22) Filed: Jun. 6, 2005

(65) Prior Publication Data
US 2006/0035672 A1 Feb. 16, 2006

Related U.S. Application Data

(60) Provisional application No. 60/600,338, filed on Aug. 10, 2004.

(51) Int. Cl.
*H04B 1/38* (2006.01)

(52) U.S. Cl. .................................................. 455/560
(58) Field of Classification Search .................. 455/560
See application file for complete search history.

(56) References Cited

U.S. PATENT DOCUMENTS

| | | | |
|---|---|---|---|
| 6,463,055 B1* | 10/2002 | Lupien et al. ................ 370/353 |
| 2002/0193110 A1* | 12/2002 | Julka et al. ................... 455/432 |
| 2003/0128676 A1* | 7/2003 | Lee .............................. 370/328 |
| 2003/0224722 A1* | 12/2003 | Martin et al. ............... 455/11.1 |
| 2003/0227921 A1* | 12/2003 | Jeon ............................ 370/394 |
| 2005/0157673 A1* | 7/2005 | Verma et al. ................. 370/328 |

* cited by examiner

Primary Examiner—Alexander Eisen
Assistant Examiner—Justin Y Lee

(57) ABSTRACT

A method for providing communication with a mobile switching center using an IP-based network interface is provided. The method includes receiving a call session message from a mobile switching center for a mobile station operating in a data mode. The call session message, which is in a first format, is converted into a second format, which corresponds to the IP-based network interface. The converted call session message is sent to a session control and mobility management (SC/MM) module for delivery to the mobile station.

20 Claims, 4 Drawing Sheets

US 7,526,320 B2

METHOD AND SYSTEM FOR PROVIDING COMMUNICATION BETWEEN A MOBILE SWITCHING CENTER AND A MOBILE STATION OPERATING IN A DATA MODE USING AN IP-BASED NETWORK INTERFACE

CROSS-REFERENCE TO RELATED APPLICATION AND CLAIM OF PRIORITY

The present invention is related to that disclosed in U.S. Provisional Patent No. 60/600,338, filed Aug. 10, 2004, entitled "Inter-working Solution." U.S. Provisional Patent No. 60/600,338 is assigned to the assignee of the present application. The subject matter disclosed in U.S. Provisional Patent No. 60/600,338 is hereby incorporated by reference into the present disclosure as if fully set forth herein. The present application hereby claims priority under 35 U.S.C. §119(e) to U.S. Provisional Patent No. 60/600,338.

TECHNICAL FIELD OF THE INVENTION

The present invention relates generally to wireless networks and, more specifically, to a method and system for providing communication between a mobile switching center and a mobile station operating in a data mode using an IP-based network interface.

BACKGROUND OF THE INVENTION

The use of cellular telephones and wireless networks has become increasingly widespread. As the use of cellular telephones has increased, the number and quality of additional features made available with the cellular telephones has also increased. For example, some mobile stations (e.g., cellular telephones) are able to provide hybrid services by allowing users to participate in either voice calls or data sessions. In this way, a single, hybrid mobile station may provide the functionality of both a cell phone and a device that is operable to send and receive e-mail, text messages, or the like over a data network.

When the hybrid mobile station is in a data mode and a voice call for the mobile station is received at a corresponding mobile switching center (MSC), the MSC has to notify the mobile station of the incoming voice call so that the mobile station may switch over to a voice mode and the call may be established. Some current techniques for establishing a call in this situation include the MSC sending a Page Request message using an A1 interface to either the packet control function (PCF) unit or the base station handling the data session for the mobile station. Thus, this requires the use of an A1 interface between the MSC and each of a number of PCFs and/or base stations, which is relatively expensive to implement.

Furthermore, this type of feature that allows voice calls to be established for mobile stations operating in a data mode, in addition to other types of CDMA2000 features, such as Feature Activation/Deactivation, Message Waiting Indication, Registration, SMS Delivery, Position Location, and Status Inquiry, may not be available to mobile stations operating in the data mode under currently implemented systems.

Therefore, there is a need in the art for improved wireless networks that provide inter-working between formerly mutually exclusive technologies, i.e., the 1xEV-DO air interface and the CDMA2000 air interface. In particular, there is a need for a wireless network that is able provide CDMA2000 features to hybrid mobile stations operating in the data mode.

SUMMARY OF THE INVENTION

In accordance with the present invention, a method and system for providing communication between a mobile switching center and a mobile station operating in a data mode using an IP-based network interface are provided that substantially eliminate or reduce disadvantages and problems associated with conventional methods and systems.

To address the above-discussed deficiencies of the prior art, it is a primary object of the present invention to provide a method for providing communication with a mobile switching center using an IP-based network interface. According to an advantageous embodiment of the present invention, the method comprises receiving a call session message from a mobile switching center for a mobile station operating in a data mode. The call session message, which is in a first format, is converted into a second format, which corresponds to the IP-based network interface. The converted call session message is sent to a session control and mobility management (SC/MM) module.

According to one embodiment of the present invention, the call session message is generated by the mobile switching center in response to receiving an incoming voice call for the mobile station at the mobile switching center.

According to another embodiment of the present invention, a notification message is sent from the SC/MM module to the mobile station based on the converted call session message, and the mobile station is operable to switch from the data mode to a voice mode based on the notification message.

According to still another embodiment of the present invention, the call session message comprises a paging request message and the notification message comprises a general page message.

According to yet another embodiment of the present invention, a paging response message is received from the SC/MM module based on an acknowledgment message received at the SC/MM module from the mobile station. The acknowledgement message is based on the general page message. The paging response message, which is in the second format, is converted into the first format. The converted paging response message is sent to the mobile switching center.

According to a further embodiment of the present invention, the first format corresponds to an A1 interface.

According to a still further embodiment of the present invention, the mobile switching center is able to communicate with mobile stations operating in the data mode through a single A1 interface.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are pro-

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
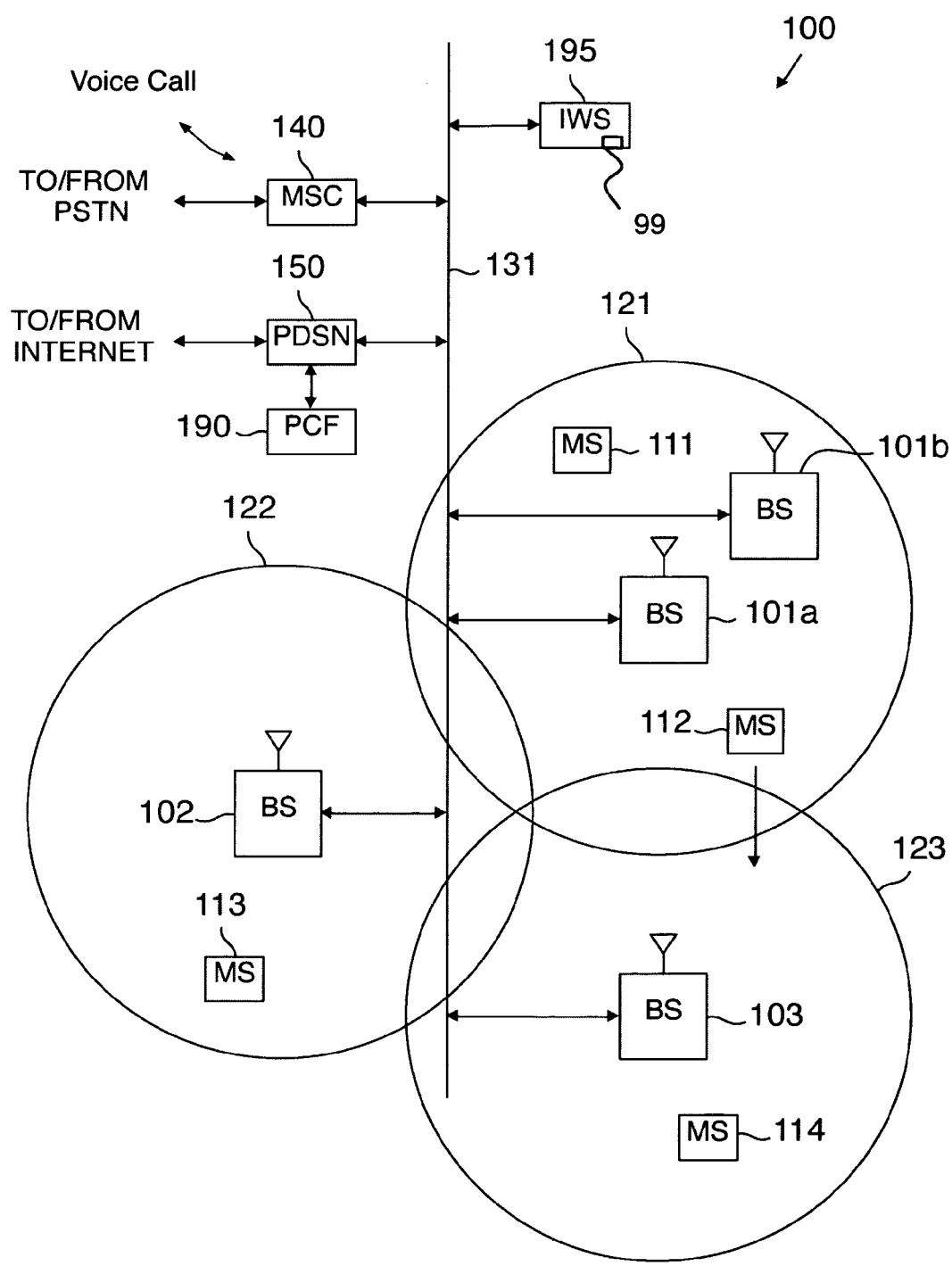
FIG. 1 illustrates an exemplary wireless network that is capable of providing communication with a mobile switching center using an IP-based network interface according to the principles of the present invention.
Figure 2A:
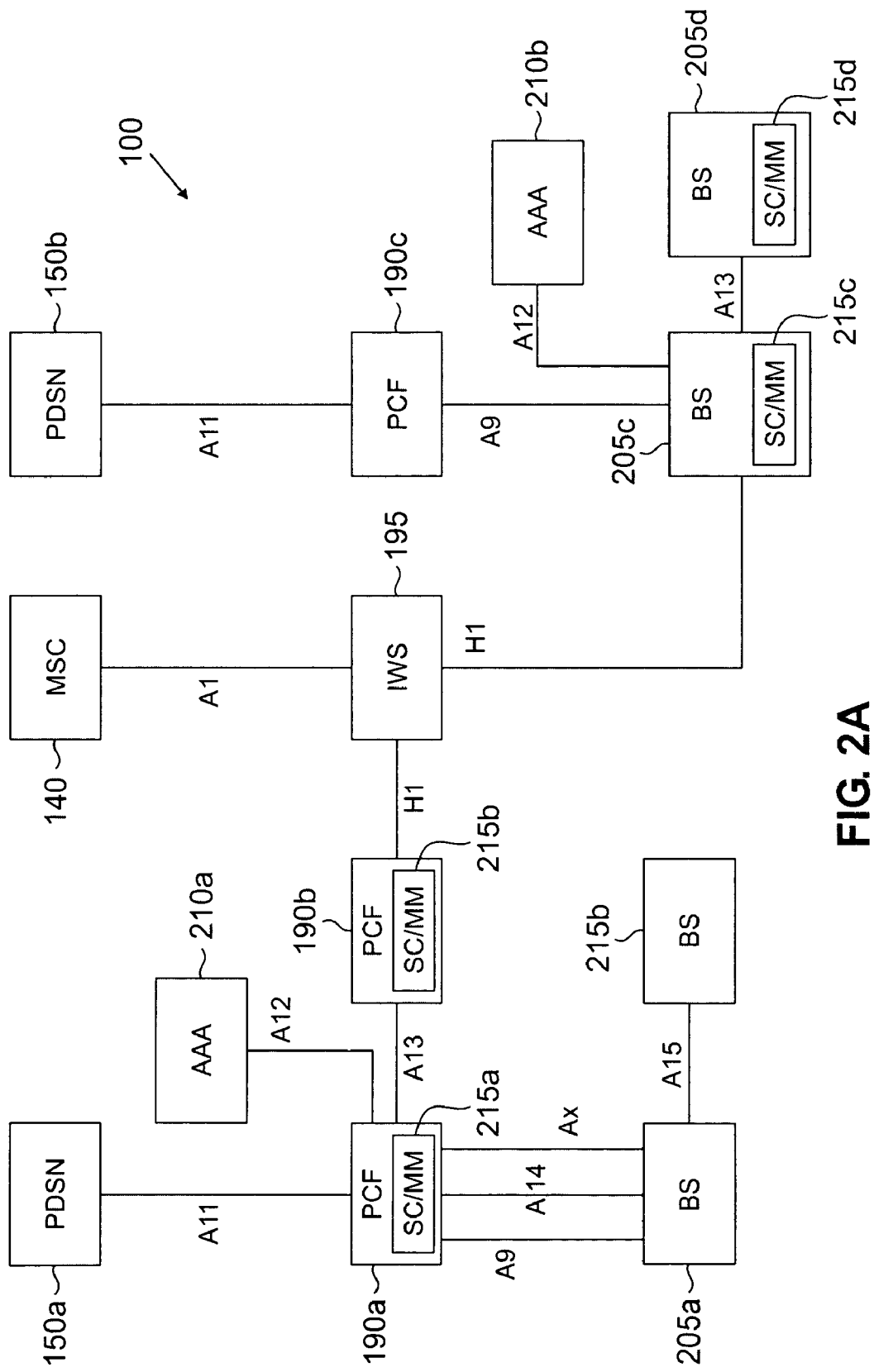
FIG. 2A illustrates portions of the wireless network of FIG. 1 in greater detail according to the principles of a first embodiment of the present invention.
Figure 2B:
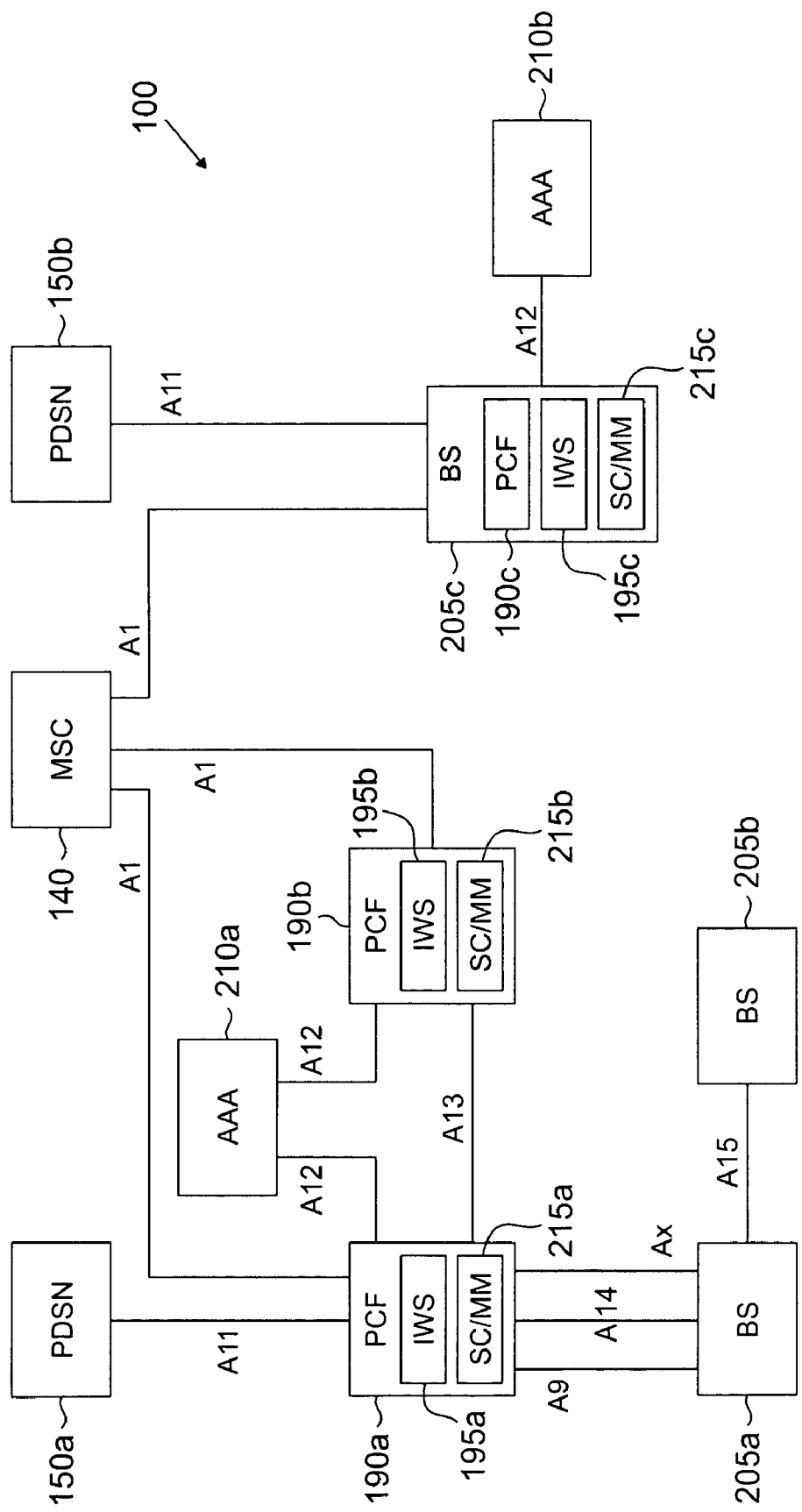
FIG. 2B illustrates portions of the wireless network of FIG. 1 in greater detail according to the principles of a second embodiment of the present invention.
Figure 3:
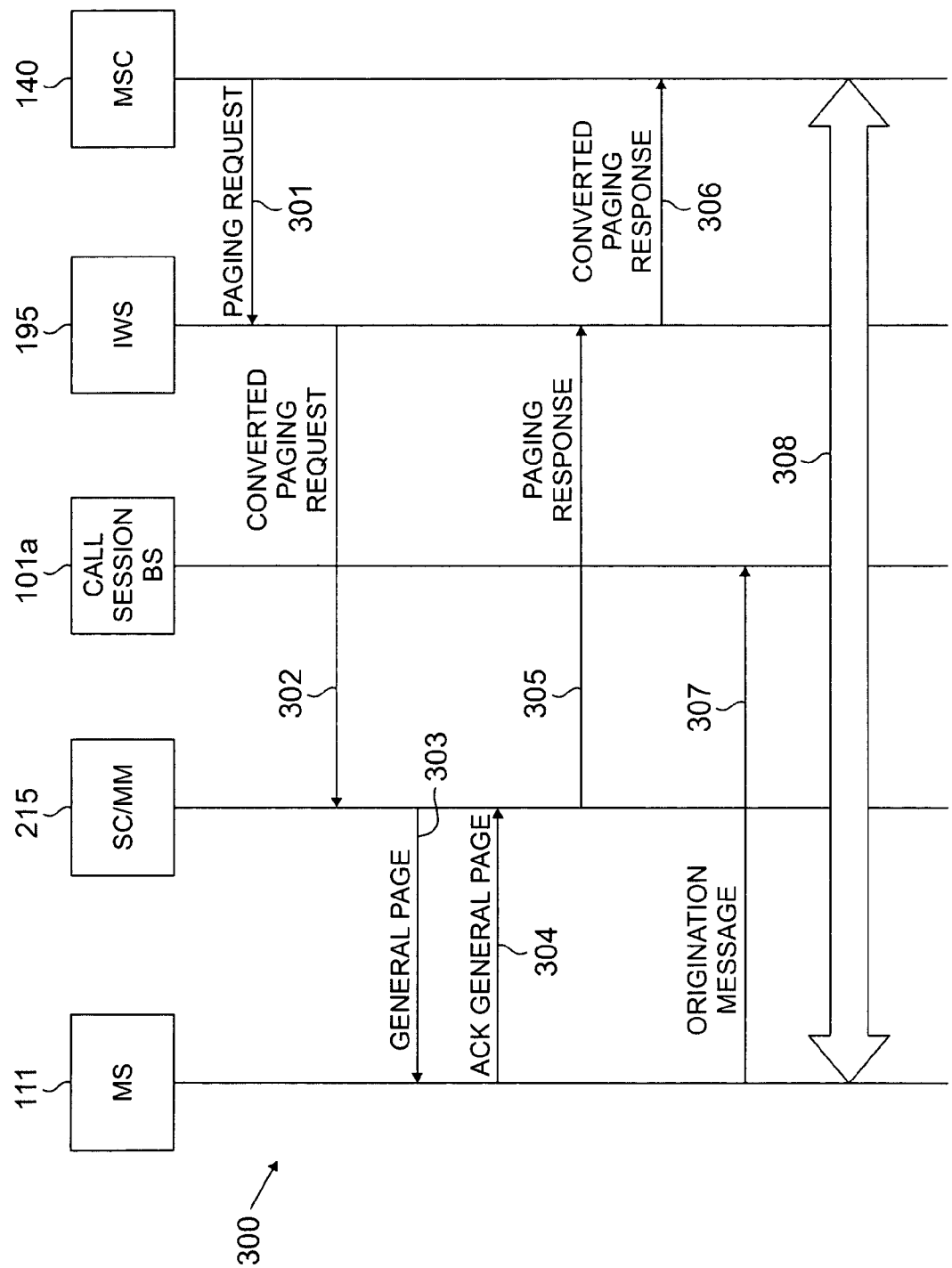
FIG. 3 is a flow diagram illustrating a voice call set-up operation according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates an exemplary wireless network 100 that is capable of providing communication with a mobile switching center using an IP-based network interface according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101a-b, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101a-b, BS 102 and BS 103, respectively.

BS 101a-b, BS 102 and BS 103 transfer voice and data signals between each other and the public switched telephone network (PSTN) (not shown) via communication line 131 and mobile switching center (MSC) 140. BS 101a-b, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101a-b, BS 102 and BS 103 that establish connections for voice and data circuits between MSC 140 and BS 101a-b, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101a-b, BS 102, or BS 103 to MSC 140.

In the exemplary wireless network 100, MS 111 is located in cell site 121 and is in communication with BS 101a or BS 101b. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As described in more detail below, at least one of mobile stations 111-114 may comprise a hybrid mobile station that is capable of communicating in a voice mode and in a data mode. In addition, one or more of the base stations 101-103 may be capable of communicating with mobile stations 111-114 in either the voice mode or the data mode. These base stations may be referred to as hybrid base stations.

For a particular alternative, one or more of the base stations, such as base station 101a, may be capable of communicating with mobile stations 111-114 only in a voice mode, while one or more other base stations, such as base station 101b, may be capable of communicating with mobile stations 111-114 only in a data mode. For this embodiment, base station 101a may be referred to as a call session base station, while base station 101b may be referred to as a data session base station. It will be understood that any suitable combination of base stations may be implemented in wireless network 100 without departing from the scope of the present invention.

For the following description, base station 101a is a call session base station that operates in a CDMA2000 environment, such as 3G-1x, and base station 101b is a data session base station that operates in a High Rate Packet Data environment, such as 1xEV-DO. It will be understood that the description also applies to a hybrid base station that includes the functionality of both base stations 101a and 101b. In addition, mobile stations 111-114 are assumed to be hybrid mobile stations.

For the illustrated embodiment, wireless network 100 comprises an inter-working server (IWS) 195 as a separate component. However, as described in more detail below in connection with FIG. 2B, IWS 195 may be integrated into one or more components of wireless network, such as PCF 190, base stations 101-103 and/or other suitable components.

Inter-working server (IWS) 195 is operable to provide call session features to hybrid mobile stations 111-114 operating in the data mode. For example, while in the data mode, a mobile station 111-114 may receive voice calls and be provided with other CDMA2000 features, such as Feature Activation/Deactivation, Message Waiting Indication, Registration, SMS Delivery, Position Location, Status Inquiry and the like. IWS 195 is able to provide these features by communicating with MSC 140 using an A1 interface and communicating with a session control and mobility management (SC/MM) module (not shown in FIG. 1) using an H1 interface, which is an IP-based network interface. Thus, IWS 195 is operable to convert messages that are in the A1 format into the H1 format and vice versa. In this way, IWS 195 is operable to provide call session features, such as CDMA2000 features, to hybrid mobile stations 111-114 while they are operating in the data mode.

In operation, according to an advantageous embodiment of the present invention, mobile station 111 is operating in a data mode and is communicating with data session base station 101b. MSC 140 receives an incoming voice call for mobile station 111. MSC 140 sends a message to IWS 195 in response to receiving the incoming voice call. IWS 195 converts the message from the A1 format to the H1 format and sends the message to an SC/MM module, which may be in PCF 190 and/or BS 101-103. The SC/MM module then sends the message to mobile station 111. Any responses from mobile station 111 destined for MSC 140 are sent by mobile station 111 to the SC/MM module, which sends the message to IWS 195 in the H1 format. IWS 195 then converts the message into the A1 format and sends the message to MSC 140.

In this way, MSC 140 may communicate with mobile station 111 while it is operating in a data mode. In addition, for the embodiment in which IWS 195 comprises a separate component, only a single A1 interface is used between MSC 140 and IWS 195. Interfaces between IWS 195 and either PCFs 190 or BSs 101-103 are H1 interfaces, which are less expensive than A1 interfaces. FIG. 1 also shows an incoming voice call for MSC 140 and a separate component 99 of IWS 195.

FIG. 2A illustrates portions of wireless network 100 in greater detail according to the principles of a first embodiment of the present invention. According to this embodiment, wireless network 100 comprises IWS 195 a separate component, which is able to couple MSC 140 to PCF 190 and/or BS 205. It will be understood that IWS 195 may be coupled to other suitable components of wireless network 100, such as additional base stations and servers, for example, that are not included in FIG. 2A for simplicity. In addition, it will be understood that each BS 205 represents a base station as described above in connection with FIG. 1.

Wireless network 100 comprises one or more authentication and authorization (AAA) modules 210, each of which is operable to perform authentication, authorization and accounting functions for wireless network 100. In addition, wireless network 100 comprises a plurality of session control and mobility management (SC/MM) modules 215, each of which is operable to store information related to data sessions for dormant mobile stations 111-114, to assign identifiers to mobile stations 111-114, to provide authentication procedures for mobile stations 111-114, and to manage location information for the mobile stations 111-114. Although the illustrated embodiment comprises two AAA modules 210 and four SC/MM modules 215, it will be understood that wireless network 100 may comprise any suitable number of AAA modules 210 and SC/MM modules 215 without departing from the scope of the present invention.

Wireless network 100 provides a plurality of interfaces between its various components. For example, the A1 interface carries signaling information between MSC 140 and IWS 195. The A9 interface carries signaling information between PCF 190 and BS 205. The A11 interface carries signaling information between PDSN 150 and PCF 190. The A12 interface carries signaling information related to mobile station authentication between SC/MM module 215 and AAA module 210. The A13 interface carries signaling information between a source SC/MM module 215 and a target SC/MM module 215. The A14 interface carries signaling information between SC/MM module 215 and BS 205. The A15 interface carries signaling information between base stations 205 when inter-BS paging is used. The Ax interface carries user traffic between SC/MM module 215 and BS 205.

Finally, the H1 interface carries signaling information between IWS 195 and SC/MM module 215. Thus, instead of providing an A1 interface between MSC 140 and each PCF 190 or BS 205, the A1 interfaces are provided only to IWS 195, which provides H1 interfaces to SC/MM modules 215 in PCF 190 or BS 205. The H1 interface comprises an IP-based network interface.

FIG. 2B illustrates portions of wireless network 100 in greater detail according to the principles of a second embodiment of the present invention. According to this embodiment, wireless network 100 comprises a plurality of IWSs 195a-c. For this embodiment, each IWS 195 may be implemented in a card that may be included in PCF 190 or BS 205 instead of as a stand-alone component. IWS 195a, IWS 195b, and IWS 195c may each comprise the full functionality of IWS 195, as described above in connection with FIGS. 1 and 2A. Although not explicitly shown in FIG. 2B, it will be understood that each IWS 195 is able to communicate with a corresponding SC/MM module 215 using an H1 interface.

FIG. 3 is a flow diagram 300 illustrating a voice call set-up operation according to one embodiment of the present invention. For the following description, it is assumed that base station (BS) 101a is a call session base station and SC/MM module 215 is contained in a data session base station. It is also assumed that hybrid mobile station (MS) 111 is initially accessing SC/MM module 215 in a data session and MSC 140 has received an incoming voice call for MS 111. It will be understood that the description also applies to a hybrid base station that includes the functionality of both base stations 101a and 101b.

In response to the incoming voice call, MSC 140 initiates the set-up of the voice call for MS 111 by transmitting a Paging Request message 301 to IWS 195. IWS 195 converts the Paging Request message 301 from the A1 format to the H1 format and then sends the Converted Paging Request message 302 over an IP network to SC/MM module 215. In response to Converted Paging Request message 302, SC/MM module 215 transmits a General Page message 303 to MS 111 that notifies MS 111 of the incoming voice call. For one embodiment, General Page message 303 may comprise a CDMA2000 General Page message included in a 3G-1x services packet. In addition, General Page message 303 may or may not comprise information identifying the party that originally initiated the voice call, such as a telephone number.

In response to General Page message 303, MS 111 transmits an acknowledgement in the form of Acknowledgment (Ack) General Page message 304 to SC/MM module 215. SC/MM module 215 transmits a Paging Response message 305 to IWS 195 based on the Ack General Page message 304. IWS 195 converts the Paging Response message 305 from the H1 format into the A1 format and then sends the Converted Paging Response message 306 to MSC 140.

Also in response to General Page message 303, MS 111 transmits an Origination Message 307 to call session BS 101a. As previously described, SC/MM module 215 and call session BS 101a may or may not be located in the same base station. In addition, MS 111 may choose the call session BS to which Origination Message 307 is to be transmitted based on which call session BS is able to provide the best service for MS 111.

If General Page message 303 comprises information identifying the initiating party, Origination Message 307 may comprise that identifying information. Origination Message 307 may also comprise a preferred voice service option that is able to notify call session BS 101a that a voice call is being set up.

Based on Origination Message 307 from MS 111, call session BS 101a, MSC 140, and MS 111 may exchange additional messages 308 related to establishing the voice call. For one embodiment, the additional messages 308 may be in a TIA-2001 messaging format.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations in a coverage area of the wireless network, a method of providing communication with a mobile switching center using an IP-based network interface, the method comprising:
   receiving a call session message from a mobile switching center for a mobile station operating in a data mode, the call session message in a first format;
   converting the call session message from the first format into a second format, the second format corresponding to the IP-based network interface;
   sending the converted call session message to a session control and mobility management (SC/MM) module;
   receiving a paging response message from the SC/MM module based on an acknowledgment message received at the SC/MM module from the mobile station, the acknowledgement message based on a general page message, the paging response message in the second format;
   converting the paging response message from the second format into the first format; and
   sending the converted paging response message to the mobile switching center.

2. The method as set forth in claim 1, the call session message generated by the mobile switching center in response to receiving an incoming voice call for the mobile station at the mobile switching center.

3. The method as set forth in claim 2, further comprising sending a notification message from the SC/MM module to the mobile station based on the converted call session message, the mobile station operable to switch from the data mode to a voice mode based on the notification message.

4. The method as set forth in claim 3, wherein the call session message comprises the paging request message and the notification message comprises the general page message.

5. The method as set forth in claim 1, the first format corresponding to an A1 interface.

6. The method as set forth in claim 5, the mobile switching center operable to communicate with mobile stations operating in the data mode through a single A1 interface.

7. The inter-working server as set forth in claim 1, the inter-working server integrated into a base station comprising the SC/MM module.

8. For use in a wireless network capable of communicating with a plurality of mobile stations in a coverage area of the wireless network, a method of providing communication with a mobile switching center using an IP-based network interface, the method comprising: providing communication between a mobile switching center and an inter-working server
   using a first network interface;
   providing communication between the inter-working server and a session control and mobility management (SC/MM) module using a second network interface, the second network interface comprising the IP-based network interface;
   receiving an acknowledgement message based on a general page message from the mobile station at the SC/MM module;
   generating a paging response message based on the acknowledgment message at the SC/MM module; and
   sending the paging response message from the SC/MM module to the inter-working server using the second network interface.

9. The method as set forth in claim 8, the SC/MM module implemented in one of a packet control function unit and a base station.

10. The method as set forth in claim 8, further comprising providing no communication between the mobile switching center and the SC/MM module using the first network interface.

11. The method as set forth in claim 8, further comprising:
receiving a call session message for a mobile station operating in a data mode from the mobile switching center at the inter-working server, the call session message in a first format corresponding to the first network interface;
converting the call session message from the first format into a second format corresponding to the second network interface at the inter-working server; and
sending the converted call session message from the inter-working server to the SC/MM module.

12. The method as set forth in claim 11, further comprising:
generating the call session message at the mobile switching center based on receiving an incoming voice call for the mobile station; and
sending a notification message from the SC/MM module to the mobile station based on the converted call session message, the mobile station operable to switch from the data mode to a voice mode based on the notification message.

13. The method as set forth in claim 8 further comprising:
Receiving the paging response message from the SC/MM module at the inter-working server, the paging response message in the second format;
Converting the paging response message from the second format into the first format at the inter-working server; and
Sending the converted paging response message from the inter-working server to the mobile switching center.

14. The inter-working server as set forth in claim 8, the inter-working server integrated into a packet control function unit comprising the SC/MM module.

15. The inter-working server as set forth in claim 8, the inter-working server integrated into a base station comprising the SC/MM module.

16. A system for use in a wireless network capable of communicating with a plurality of mobile stations in a coverage area of the wireless network, comprising:
an inter-working server operable to receive a call session message from a mobile switching center for a mobile station operating in a data mode, to convert the call session message from a first format into a second format, the second format corresponding to an IP-based network interface, and to send the converted call session message to a session control and mobility management (SC/MM) module, wherein the call session message comprises a paging request message, the inter-working server is further operable to receive a paging response message from the SC/MM module based on an acknowledgment message received at the SC/MM module from the mobile station, to convert the paging response message from the second format into the first format, and to send the converted paging response message to the mobile switching center.

17. The inter-working server as set forth in claim 16, the first format corresponding to an A1 interface.

18. The inter-working server as set forth in claim 16, the inter-working server comprising a separate component operable to couple the mobile switching center to one or more packet control function units comprising SC/MM modules and to one or more base stations comprising SC/MM modules.

19. The inter-working server as set forth in claim 16, the inter-working server integrated into a packet control function unit comprising the SC/MM module.

20. The inter-working server as set forth in claim 16, the inter-working server integrated into a base station comprising the SC/MM module.

* * * * *